United States Patent
Hsu et al.

(10) Patent No.: US 9,856,909 B1
(45) Date of Patent: Jan. 2, 2018

(54) HINGE ASSEMBLY

(71) Applicant: FIRST DOME CORPORATION, New Taipei (TW)

(72) Inventors: An-Szu Hsu, New Taipei (TW); Hsu-Hong Yao, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 15/480,812

(22) Filed: Apr. 6, 2017

(30) Foreign Application Priority Data

Nov. 18, 2016 (TW) .............................. 105217642 U

(51) Int. Cl.
| | |
|---|---|
| E05D 7/00 | (2006.01) |
| E05D 3/06 | (2006.01) |
| F16C 11/04 | (2006.01) |
| E05D 3/12 | (2006.01) |
| E05D 11/10 | (2006.01) |
| G06F 1/16 | (2006.01) |
| F16M 13/00 | (2006.01) |

(52) U.S. Cl.
CPC .............. *F16C 11/04* (2013.01); *E05D 3/122* (2013.01); *E05D 7/00* (2013.01); *E05D 11/1028* (2013.01); *G06F 1/1681* (2013.01); *E05Y 2900/606* (2013.01); *F16M 13/00* (2013.01)

(58) Field of Classification Search
CPC ................. Y10T 16/542; Y10T 16/543; Y10T 16/5443; Y10T 16/5445; Y10T 16/5448; Y10T 16/545; Y10T 16/54038; G06F 1/16; G06F 1/1616; G06F 1/1681; G06F 1/166; G06F 1/1679; H04M 1/022; H04M 1/0214; H04M 1/0216; H04M 1/0222; H05K 5/0086; H05K 5/0226; F16M 11/10; E05D 11/06; E05D 11/1021; E05D 11/1078; E05D 11/082; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606
See application file for complete search history.

(56) References Cited

U.S. PATENT DOCUMENTS

| | | | |
|---|---|---|---|
| 9,304,549 B2 * | 4/2016 | Siddiqui | .................. E05D 7/00 |
| 9,366,064 B1 * | 6/2016 | Chen | ......................... E05D 3/12 |
| 9,404,298 B1 * | 8/2016 | Chen | ...................... G06F 1/1681 |
| 9,518,414 B1 * | 12/2016 | Chen | ..................... G06F 1/1681 |
| 2007/0272809 A1 * | 11/2007 | Jang | ..................... F16M 11/105 |
| | | | 248/133 |
| 2009/0070961 A1 * | 3/2009 | Chung | .................. E05D 3/122 |
| | | | 16/354 |

(Continued)

*Primary Examiner* — Chuck Mah
(74) *Attorney, Agent, or Firm* — Michael Best & Friedrich LLP

(57) ABSTRACT

A hinge assembly includes a mounting seat and a linkage unit in the mounting seat. A connection member is connected between first and second movable portions of the linkage unit by a linkage spindle. The linkage unit is able to rotate by a resilient unit to a spring-out state from a folded state. When the linkage unit reaches the spring-out state, further rotation of the linkage unit is stopped by a limiting unit. A torque spindle provides torsional resistance only when the linkage unit is rotated further from the spring-out state.

13 Claims, 12 Drawing Sheets

(56) References Cited

U.S. PATENT DOCUMENTS

| | | | | |
|---|---|---|---|---|
| 2011/0157780 A1* | 6/2011 | Wang | ................... | G06F 1/1681 |
| | | | | 361/679.01 |
| 2012/0096678 A1* | 4/2012 | Zhang | ................... | G06F 1/1681 |
| | | | | 16/302 |
| 2012/0328222 A1* | 12/2012 | Chen | ................... | G06F 1/1616 |
| | | | | 384/26 |
| 2015/0309541 A1* | 10/2015 | Horng | ................... | E05D 3/12 |
| | | | | 16/250 |
| 2016/0083989 A1* | 3/2016 | Kuo | ................... | E05D 1/04 |
| | | | | 16/355 |
| 2016/0097227 A1* | 4/2016 | Hsu | ................... | G06F 1/16 |
| | | | | 16/354 |
| 2017/0003719 A1* | 1/2017 | Siddiqui | ................... | E05D 1/04 |

* cited by examiner

HINGE ASSEMBLY

CROSS-REFERENCE TO RELATED APPLICATION

This application claims priority to Taiwanese Patent Application No. 105217642, filed on Nov. 18, 2016.

FIELD

The disclosure relates to a hinge assembly, and more particularly to a hinge assembly for a tablet computer.

BACKGROUND

An existing tablet computer is formed with a support mechanism. The support mechanism includes a main body, a support plate, and a hinge assembly disposed in the main body and connecting the main body with the support plate. When the hinge assembly is in a fully folded state, the support plate is received in and flush with an outer surface of the main body. When the support plate is rotated relative to the main body to a desired angle, the hinge assembly functions to provide a resistance force against an application force for positioning the support plate at the desired angle formed between the support plate and the main body. Therefore, the existing tablet computer is supported on and lifted from a desktop by the support plate.

However, because the support plate has an edge contiguous to the main body, the support plate and the main body may abrade each other at the commencement of the rotation of the support plate relative to the main body. The support plate may therefore be unable to operate smoothly, and the service life thereof may be reduced.

SUMMARY

Therefore, an object of the disclosure is to provide a hinge assembly that can alleviate at least one drawback of the prior art.

According to the disclosure, a hinge assembly includes a mounting seat, a linkage unit, a connection member, a linkage spindle, a resilient unit, a limiting unit and a torque unit.

The mounting seat has a first lateral wall, a second lateral wall opposite to the first lateral wall, and a receiving space disposed between the first and second lateral walls.

The linkage unit includes a first linkage set and a second linkage set. The first linkage set is adjacent to the first lateral wall and includes a first positioning portion and a first movable portion. The second linkage set is adjacent to the second lateral wall and includes a second positioning portion and a second movable portion. The first and second positioning portions are positioned in the receiving space and co-rotatable about an axis extending through the first and second lateral walls.

The connection member has a tubular pivot portion and a connection portion. The tubular pivot portion is disposed between the first and second movable portions. The connection portion extends radially and outwardly from the tubular pivot portion.

The linkage spindle is parallel to the axis and extends through the first and second movable portions and the tubular pivot portion. The linkage spindle and the first and second movable portions and the tubular pivot portion are rotatable together about the axis of the first and second positioning portions.

The resilient unit connects between the mounting seat and the linkage unit to urge the linkage unit to rotate to a spring-out state, in which the first and second movable portions and the connection member move outward from the receiving space, from a folded state, in which the first and second movable portions and the connection member are disposed in the receiving space.

The limiting unit is connected to the linkage unit to limit further rotation of the linkage unit when the linkage unit reaches the spring-out state.

The torque unit is connected to the linkage unit to provide a torsional resistance when the linkage unit and the connection member are rotated by an external force to move away from the folded state and the spring-out state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
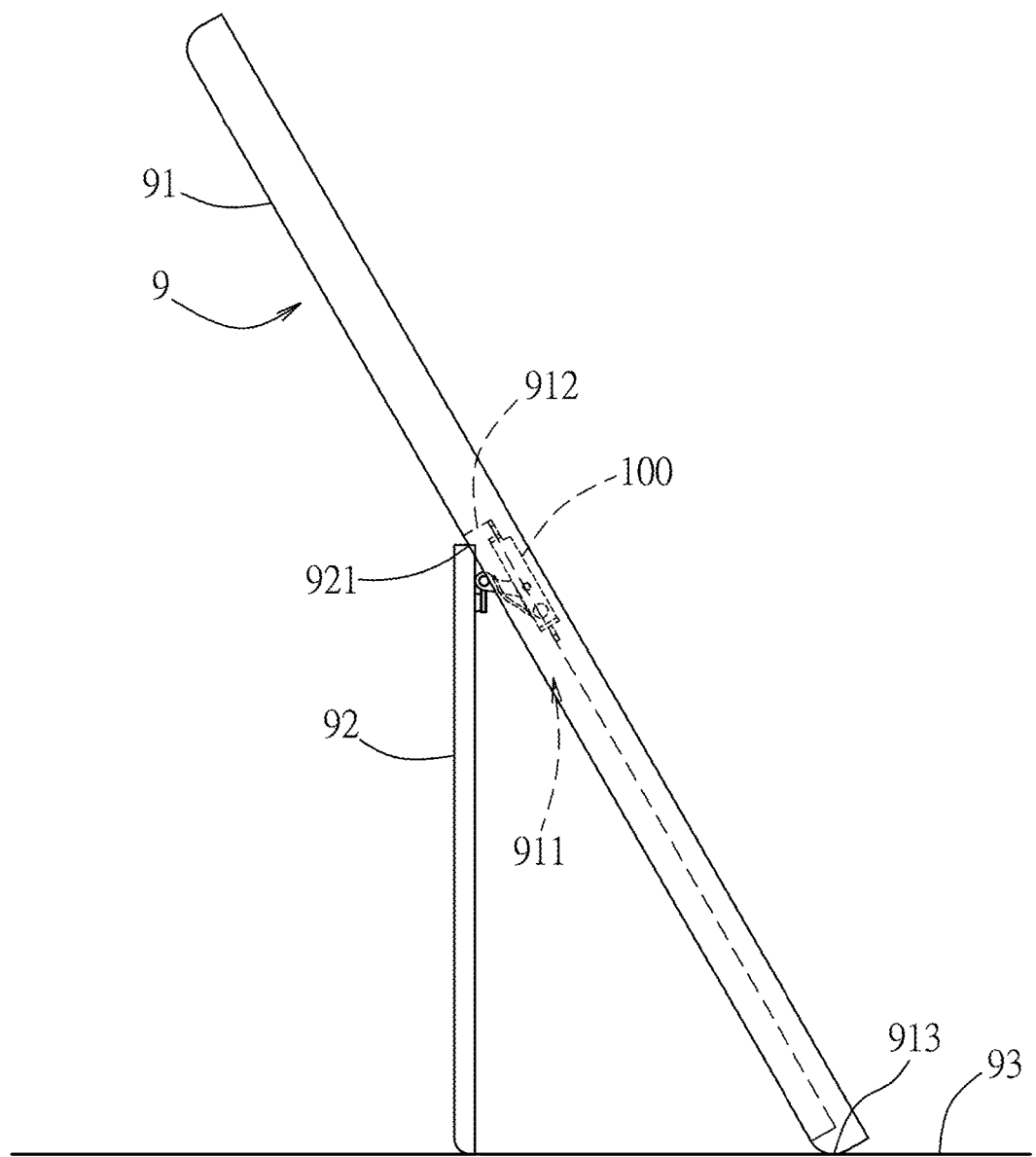
FIG. 1 is a side view of a tablet computer incorporating a hinge assembly according to an embodiment of the present disclosure.

Referring to FIG. 1, a hinge assembly 100 according to an embodiment of the present disclosure is connected to a casing body 91 of a tablet computer 9 and a support plate 92 such that the support plate 92 is pivotable away from a bottom end 913 of the casing body 91 by an angle to support the casing body 91 on a plane such as a desktop 93.

The casing body 91 has an accommodating portion 911 to accommodate the support plate 92, and an inner surrounding wall 912 defining the accommodating portion 911. The support plate 92 has a pivot end 921.

Figure 2:
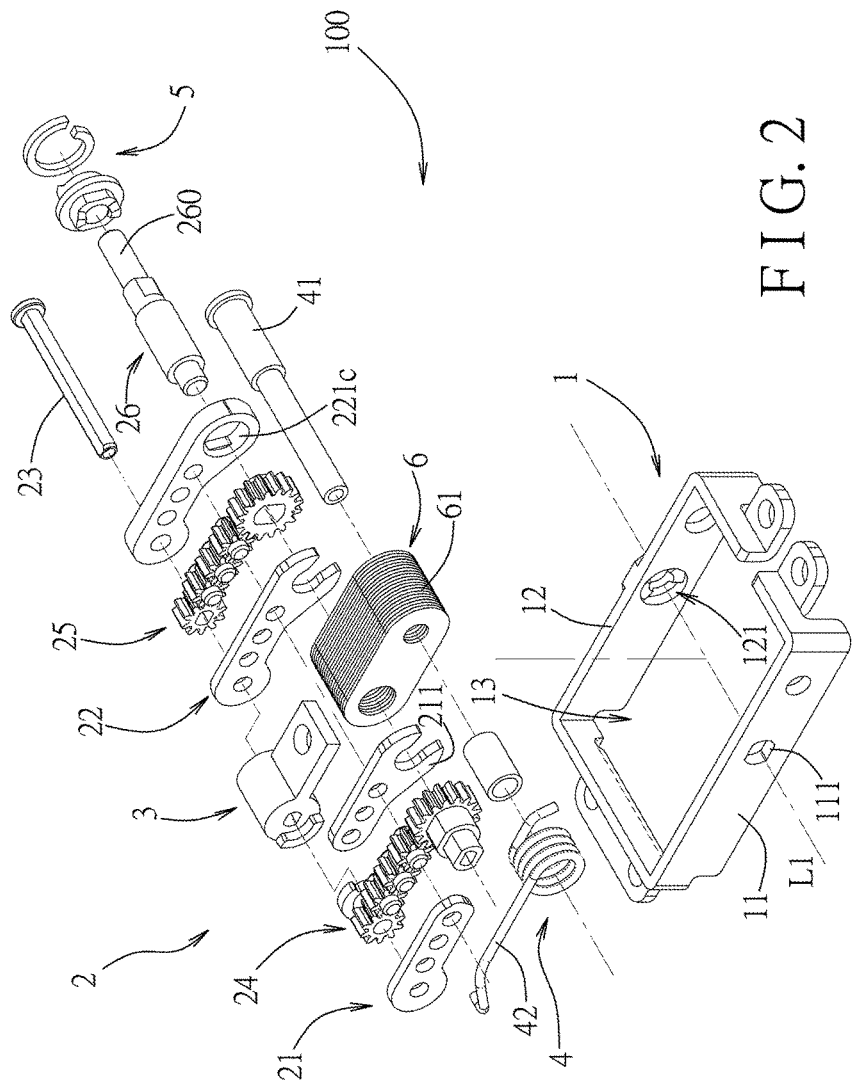
FIG. 2 is an exploded perspective view of the hinge assembly according to the embodiment.

Referring to FIG. 2, the hinge assembly 100 includes a mounting seat 1, a linkage unit 2, a connection member 3, a linkage spindle 23, a resilient unit 4, a limiting unit 5 and a torque unit 6.

The mounting seat 1 is disposed adjacent to the inner surrounding wall 912. In addition, the mounting seat 1 has a first lateral wall 11, a second lateral wall 12 opposite to the first lateral wall 11, and a receiving space 13 disposed between the first and second lateral walls 11, 21. The first lateral wall 11 has a non-circular through hole 111. The second lateral wall 12 has a restricting groove 121.

The linkage unit 2 includes a first linkage set 21 and a second linkage set 22.

Figure 3:
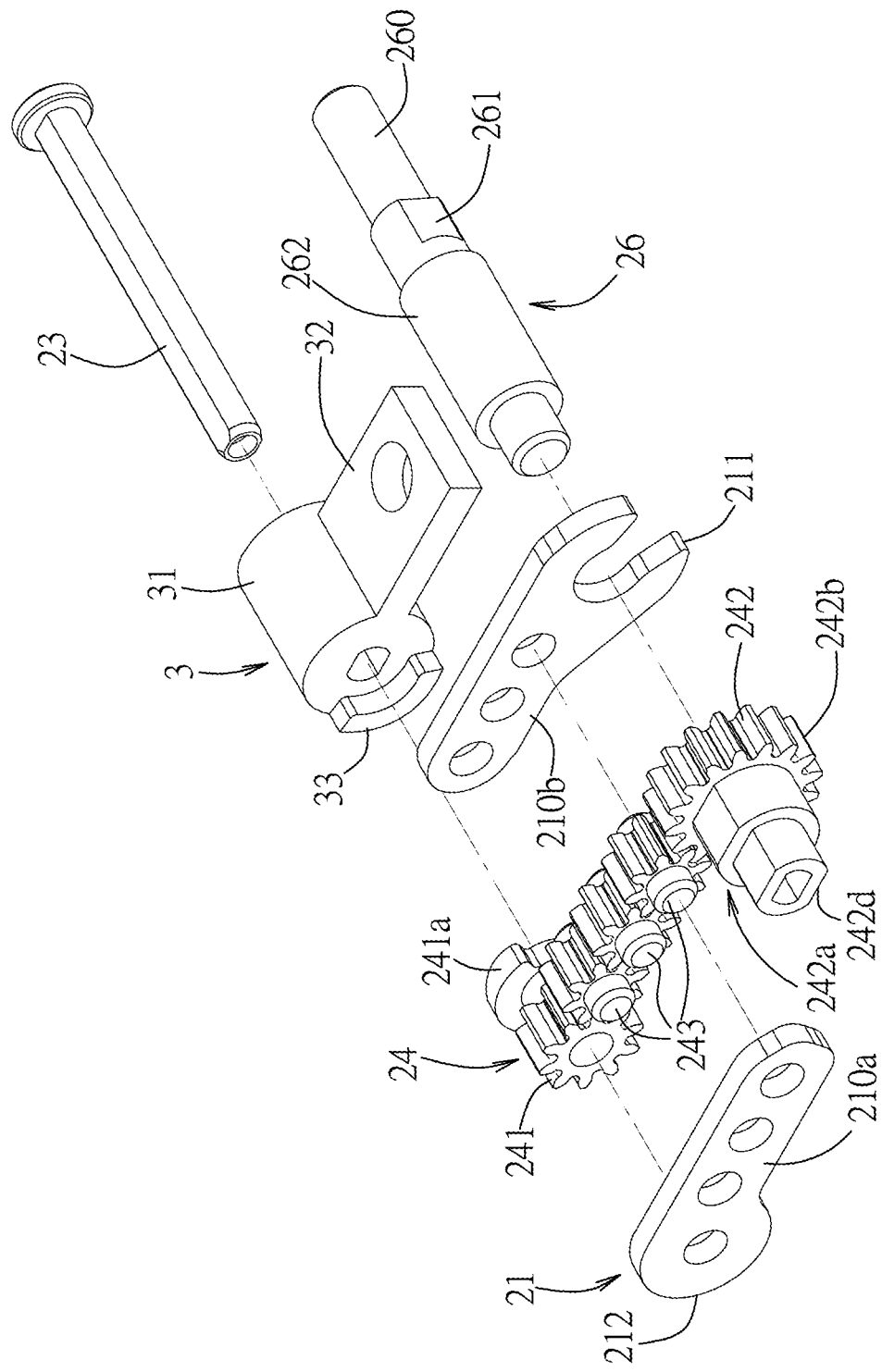
FIG. 3 is a partly exploded perspective view of the embodiment, illustrating a position relation of a first linkage set, a first gear set, a connection member, a linkage spindle and a torque spindle of the hinge assembly.
Figure 4:
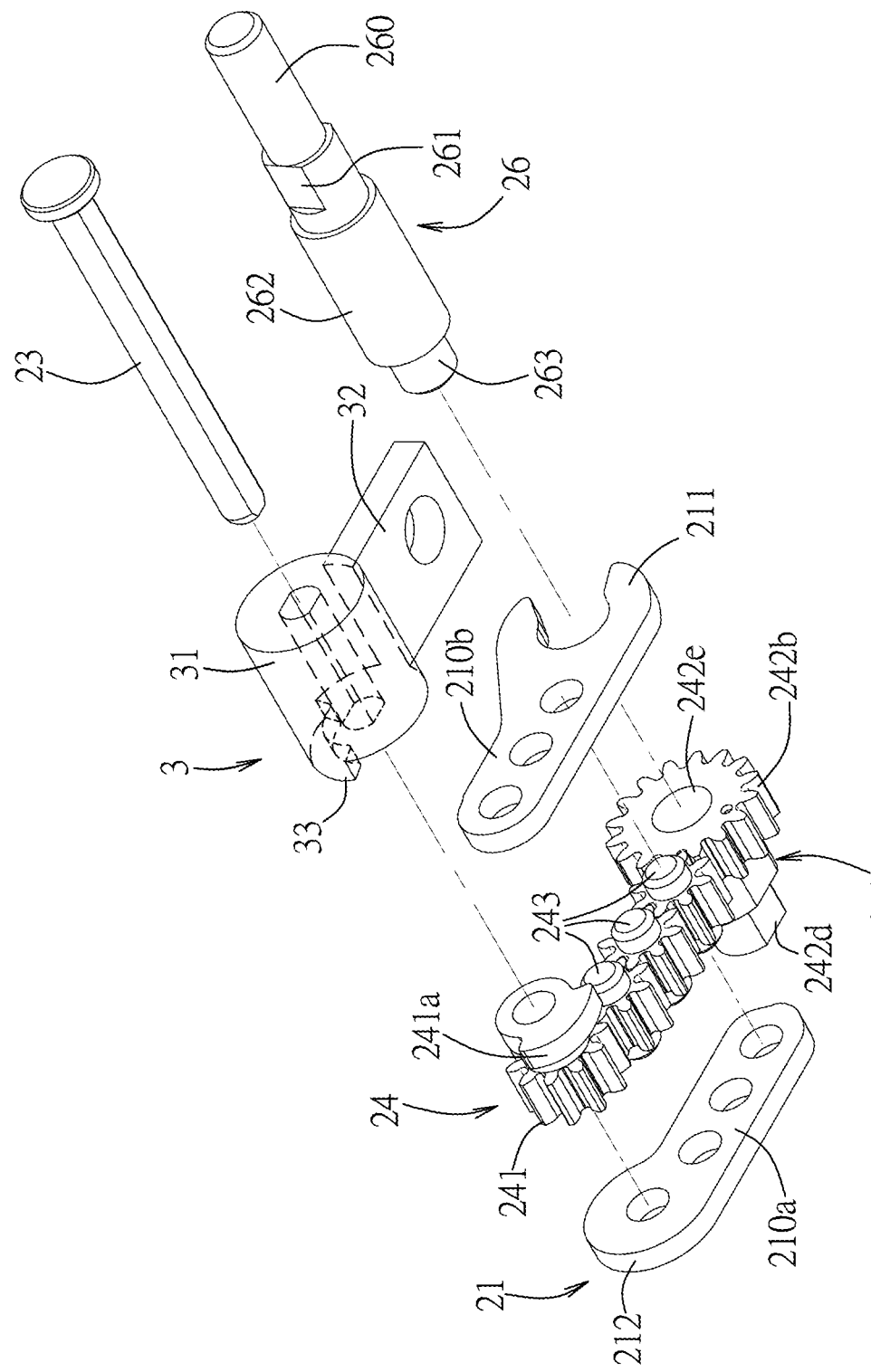
FIG. 4 is similar to FIG. 3 but being viewed from a different angle.

Referring to FIGS. 3 and 4, in combination with FIG. 2, the first linkage set 21 is adjacent to the first lateral wall 11, and includes a pair of first linkage plates 210a, 210b. The first linkage plate 210a has a first movable portion 212. The first linkage plate 210b has a positioning portion 211.

Figure 5:
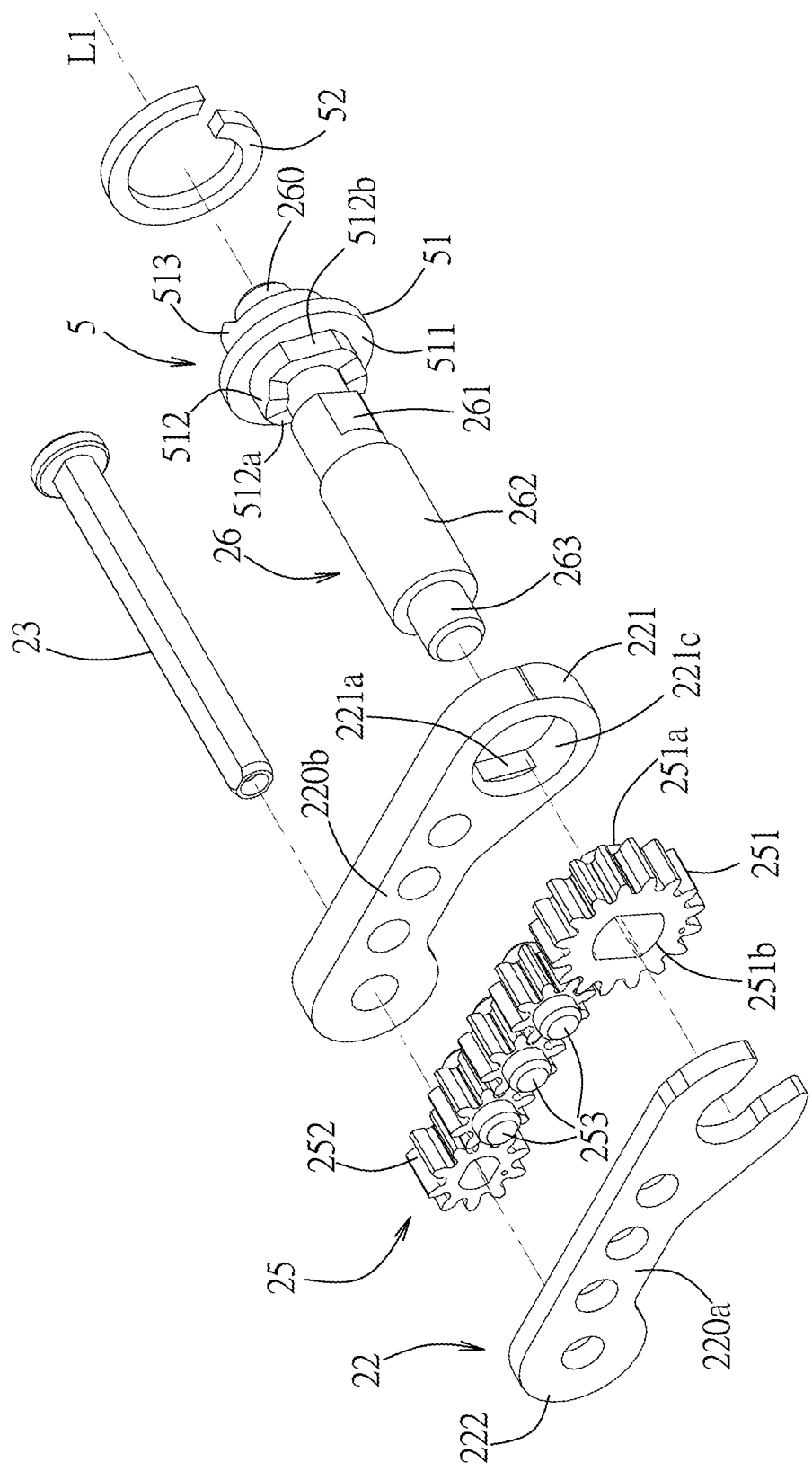
FIG. 5 is a partly exploded perspective view of the embodiment, illustrating a position relation of a second linkage set, a second gear set, a limiting unit, the linkage spindle and the torque spindle of the hinge assembly.
Figure 6:
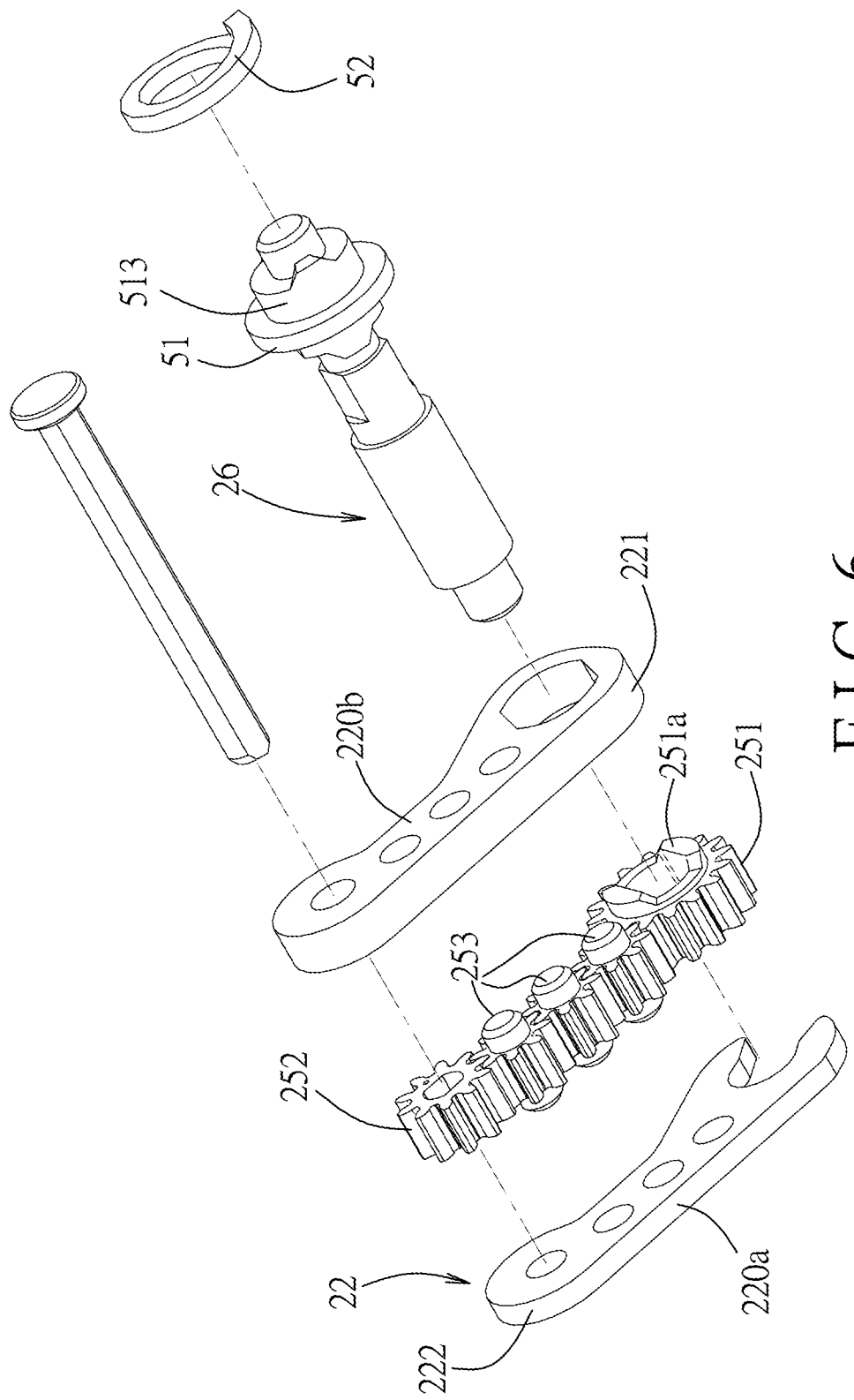
FIG. 6 similar to FIG. 5 but being viewed from a different angle.

Referring to FIGS. 5 and 6, in combination with FIG. 2, the second linkage set 22 is adjacent to the second lateral wall 12, and includes a pair of second linkage plates 220a, 220b. The second linkage plate 220a has a second movable portion 222. The second linkage plate 220b has a second positioning portion 221, and a through hole 221c formed in the second positioning portion 221.

Figure 7:
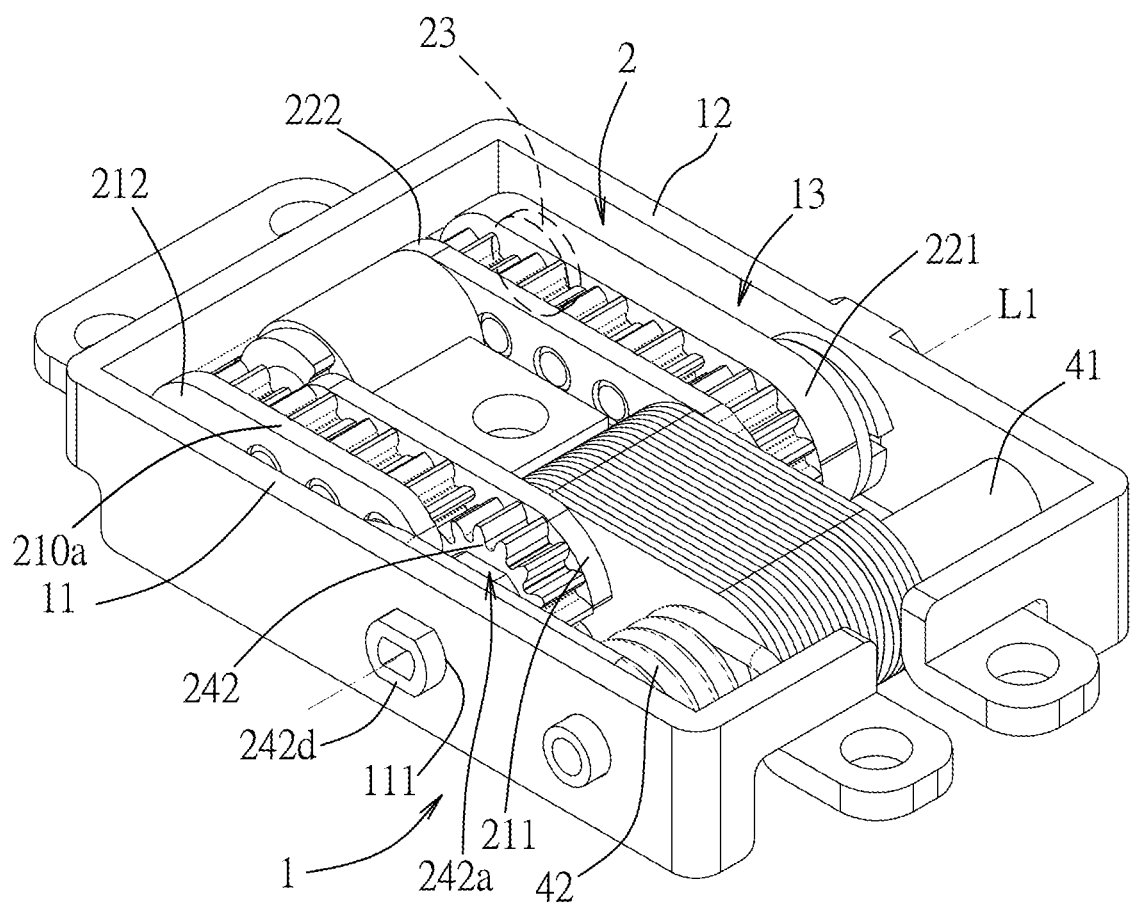
FIG. 7 is a perspective view of the embodiment, illustrating the hinge assembly in a folded state.

Referring to FIG. 7, the first and second positioning portions 211, 221 are positioned in the receiving space 13 and co-rotatable about a rotation axis (L1) extending through the first and second lateral walls 11, 12.

Referring back to FIGS. 3 and 4, the connection member 3 has a tubular pivot portion 31, a connection portion 32 and a driven rib 33. The tubular pivot portion 31 is disposed between the first and second movable portions 212, 222. The connection portion 32 extends radially and outwardly from the tubular pivot portion 31, and is connected to the pivot end 921 (see FIG. 1) of the support plate 92. The driven rib 33 extends axially from the tubular pivot portion 31 toward the first linkage set 21.

The linkage spindle 23 is parallel to the rotation axis (L1) (see FIG. 7), and extends through the first and second movable portions 212, 222 and the tubular pivot portion 31. The linkage spindle 23, the first and second movable portions 212, 222, and the tubular pivot portion 31 are rotatable together about the rotation axis (L1) of the first and second positioning portions 211, 221.

The linkage unit 2 further includes a first gear set 24 connected to the first linkage set 21, and a second gear set 25 connected to the second linkage set 22. The first and second gear sets 24, 25 are respectively disposed at two opposite sides of the connection member 3.

Referring back to the FIGS. 3 and 4, the first gear set 24 includes a driven gear 241, a stationary gear 242, and three first intermediate gears 243. The driven gear 241 is juxtaposed with the first movable portion 212 and sleeved rotatably on the linkage spindle 23. The driven gear 241 is formed with an abutting rib 241a that is mated with the driven rib 33 to rotate the connection portion 32. The stationary gear 242 is juxtaposed with the first positioning portion 211. The first intermediate gears 243 are disposed between and meshed with the driven gear 241 and the stationary gear 242. In this embodiment, the stationary gear 242 has a journaled portion 242a, a toothed wheel portion 242b surrounding the journaled portion 242a, and a connecting groove 242e formed centrally in the toothed wheel portion 242b. As sown in FIG. 7, the journaled portion 242a has a non-circular section 242d conforming in cross-section to and extending fittingly through the non-circular through hole 111, so that the stationary gear 242 is not rotatable.

Referring back to the FIGS. 5 and 6, the second linkage plates 220a, 220b are disposed on two opposite sides of the second gear set 25. The second gear set 25 includes a functioning gear 251, a transmitting gear 252 and three second intermediate gears 253. The functioning gear 251 is juxtaposed with the second positioning portion 221, and is sleeved on and rotatable together with a torque spindle 26, which will be described in detail hereinafter. The transmitting gear 252 is sleeved on and rotatable together with the linkage spindle 23. The second intermediate gears 253 are disposed between and meshed with the functioning gear 251 and the transmitting gear 252.

The functioning gear 251 has a spindle hole 251b extending therethrough, and a second cam structure 251a disposed on one of two opposite sides of the functioning gear 251 and around the spindle hole 251b.

With reference back to FIGS. 2 and 7, the resilient unit 4 connects between the mounting seat 1 and the linkage unit 2 to urge the linkage unit 2 to rotate to a spring-out state, in which the first and second movable portions 212, 222 and the connection member 3 move outward from the receiving space 13, from a folded state, in which the first and second movable portions 212, 222 and the connection member 3 are disposed in the receiving space 13. The resilient unit 4 includes a positioning rod 41 and a coiled spring 42. The positioning rod 41 has two opposite ends respectively extending into the first and second lateral walls 11, 12. The coiled spring 42 is sleeved on the positioning rod 41, and has one end fixed to the mounting seat 1 and another end connected to the linkage unit 2, (specifically, abutting against the first linkage plate 210a).

With reference back to FIGS. 2, 5 and 6, the limiting unit 5 is connected to the linkage unit 2 through the torque spindle 26 to limit further rotation of the linkage unit 2 when the linkage unit 2 reaches the spring-out state. The limiting unit 5 includes a limiting member 51 slidably sleeved on the torque spindle 26 between the second linkage set 22 and the second lateral wall 12, and a returning spring 52 disposed between the limiting member 51 and the second lateral wall 12 to urge the limiting member 51. The limiting member 51 has a ring body 511, a first annular member 512 extending from the ring body 511 into the through hole 221c of the second positioning portion 221, and a second annular member 513 extending from the ring body 511 toward the second lateral wall 12. The first annular member 512 has an end face formed with a first cam structure 512a, and a circumferential surface formed with a first engaging structure 512b to be engaged with a second engaging structure 221a formed inside the through hole 221c. The restricting groove 121 in the second lateral wall 12 is configured to accommodate and limit the second annular member 513 from rotating.

The torque unit 6 is connected to the linkage unit 2 to provide a torsional resistance when the linkage unit 2 and the connection member 3 are rotated by an external force to move away from the folded state and the spring-out state. The torque unit 6 includes a plurality of torque plates 61, and the torque spindle 26 that has a friction part 262 inserted into the torque plates 61 in interference fit. The torque spindle 26 is centered at the rotation axis (L1), and extends through the first positioning portion 211 and the through hole 221c of the second positioning portion 221. The torque spindle 26 has a first end 260 (see FIG. 10) extending through the second lateral wall 12, and a second end 263 (see FIG. 4) opposite to the first end 260 and inserted into the connecting groove 242e (see FIG. 4) of circular cross section. The torque spindle 26 is rotatable about the rotation axis (L1) relative to the stationary gear 242. In addition, the torque spindle 26 further has a limiting portion 261 interferentially fitted into the spindle hole 251b of the functioning gear 251.

Figure 8:
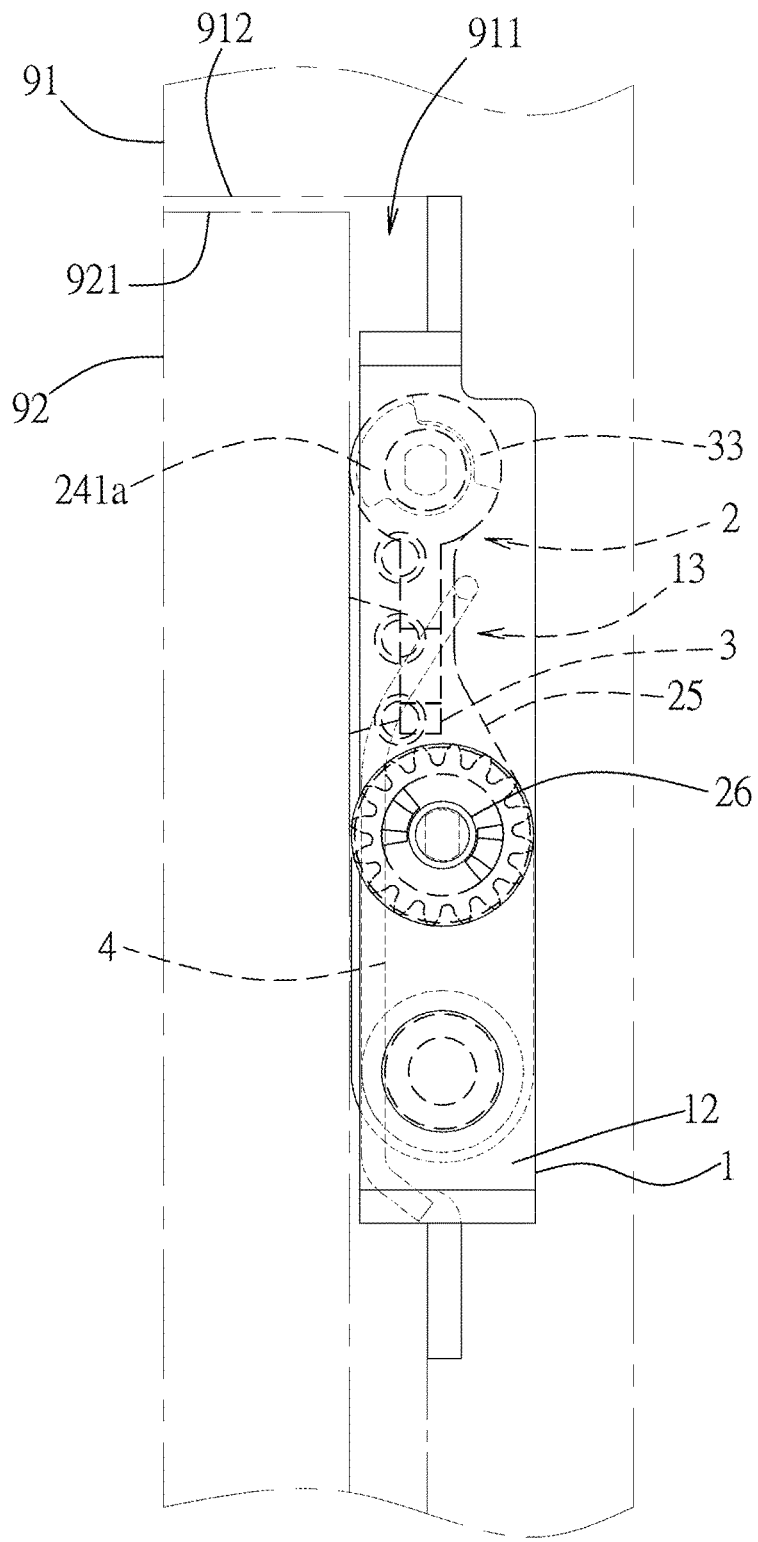
FIG. 8 is a side view of the embodiment, illustrating a support plate within a casing body of the tablet computer when the hinge assembly in a folded state.

Referring to FIG. 8, in combination with FIG. 7, when the linkage unit 2 is in the folded state, the support plate 92 is situated inside the accommodating portion 911 of the casing body 91, and is flush with the outer surface of the casing body 91. The pivot end 921 of the support plate 92 is contiguous to the inner surrounding wall 912 of the casing body 91. The support plate 92 may be positioned in the accommodating portion 911 by magnetic attraction of a strong magnet (not shown) to press the linkage unit 2 and the connection member 3 into the receiving space 13 so that the linkage unit 2 overcomes the resilient force of the resilient unit 4 and is received in the receiving space 13.

When the support plate 92 is operated to overcome the magnetic attraction, the linkage unit 2 is released from compression of the support plate 92 and is rotated to the spring-out state (see FIG. 9) by a restoring force of the resilient unit 4. During rotation of the linkage unit 2 to the spring-out state, the first and second positioning portions 211, 221 rotate relative to the torque spindle 26, the first and second movable portions 212, 222 rotate relative to the linkage spindle 23, and the tubular pivot portion 31 and the linkage spindle 23 do not rotate.

Figure 9:
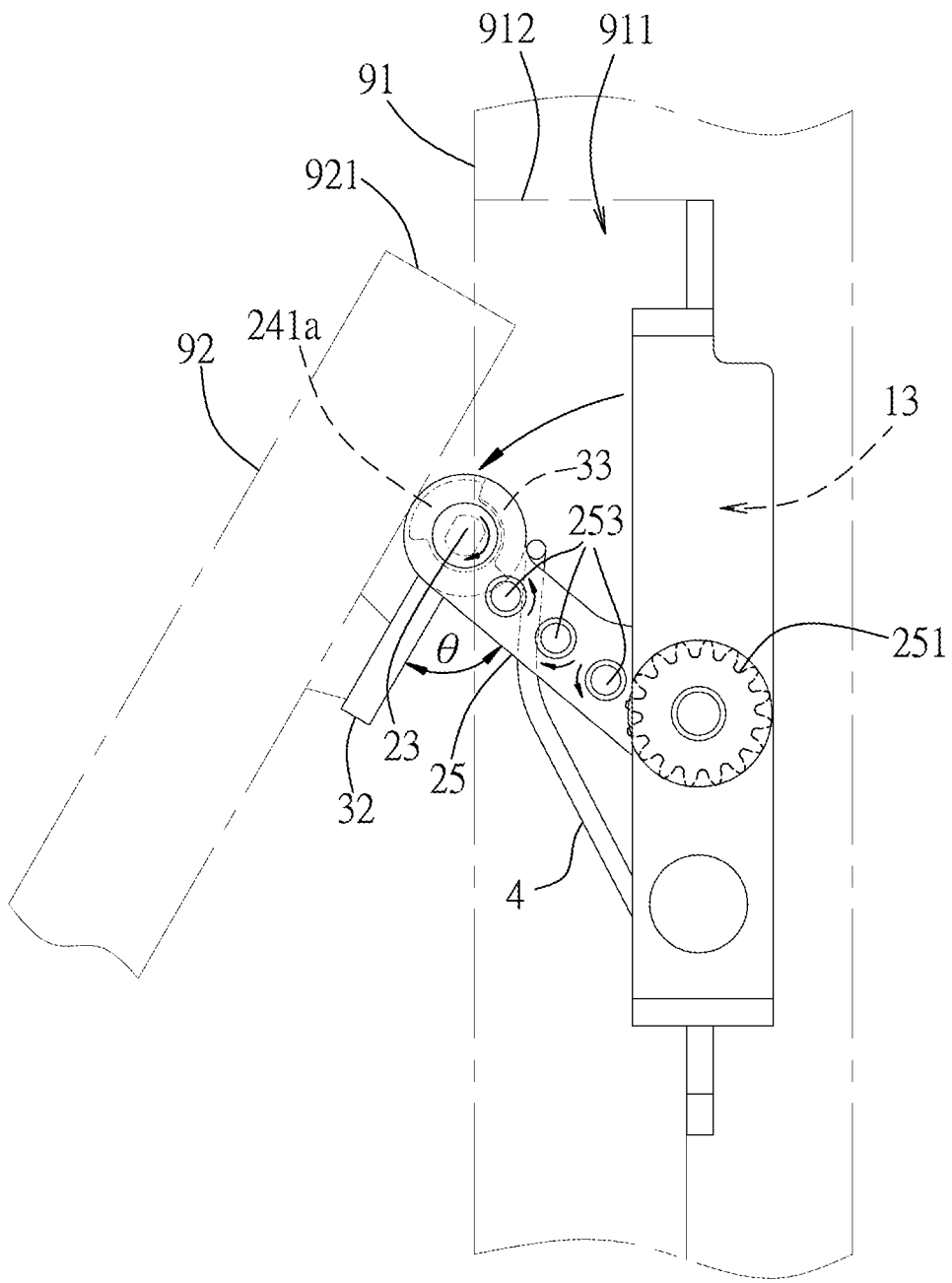
FIG. 9 is a side view of the embodiment, illustrating the support plate moved out the casing body when the hinge assembly in a spring-out state.

As shown in FIGS. 2, 8 and 9, during rotation of the linkage unit 2 from the folded state (see FIG. 8) to the spring-out state (see FIG. 9) by the action of the resilient unit 4, the first intermediate gears 243 (see FIG. 4) rotate around the stationary gear 242, and the driven gear 241 rotates together with the abutting rib 241a which in turn pushes the driven rib 33 to rotate clockwise the tubular pivot portion 31, thereby rotating the connection portion 32 to a predetermined angle θ. In this embodiment, the predetermined angle θ of the connection portion 32 may be smaller than 30 degrees by virtue of the arrangement of the first gear set 24. Accordingly, even if the support plate 92 may wobble during rotation of the linkage unit 2 from the folded state to the spring-out state, the pivot end 921 of the support plate 92 and the inner surrounding portion 912 of the casing body 91 will not abrade each other. The support plate 92 is able to move smoothly into or out of the casing body 91.

With reference back to FIGS. 2 and 9, during rotation of the linkage unit 2 from the folded state to the spring-out state, the second gear set 25 is rotated about the torque spindle 26. The connection portion 32 drives rotation of the linkage spindle 23, which rotates the transmitting gear 252 and the second intermediate gears 253. At this state, because the functioning gear 251 is connected to the torque spindle 26 which creates torsional resistance with the torque plates 61, the functioning gear 251 is not rotated by the second intermediate gears 253. In other words, the functioning gear 251 of the second gear set 25 does not rotate, like the stationary gear 242 of the first gear set 24. Thus, the second intermediate gears 253 are rotated around the functioning gear 251. During rotation of the connection portion 32 to the spring-out state by the predetermined angle θ, because the torque spindle 26 is not rotated relative to the torque plates 61, wear caused to the torque unit 6 may be reduced to prolong the service life of the hinge assembly 100.

Figure 10:
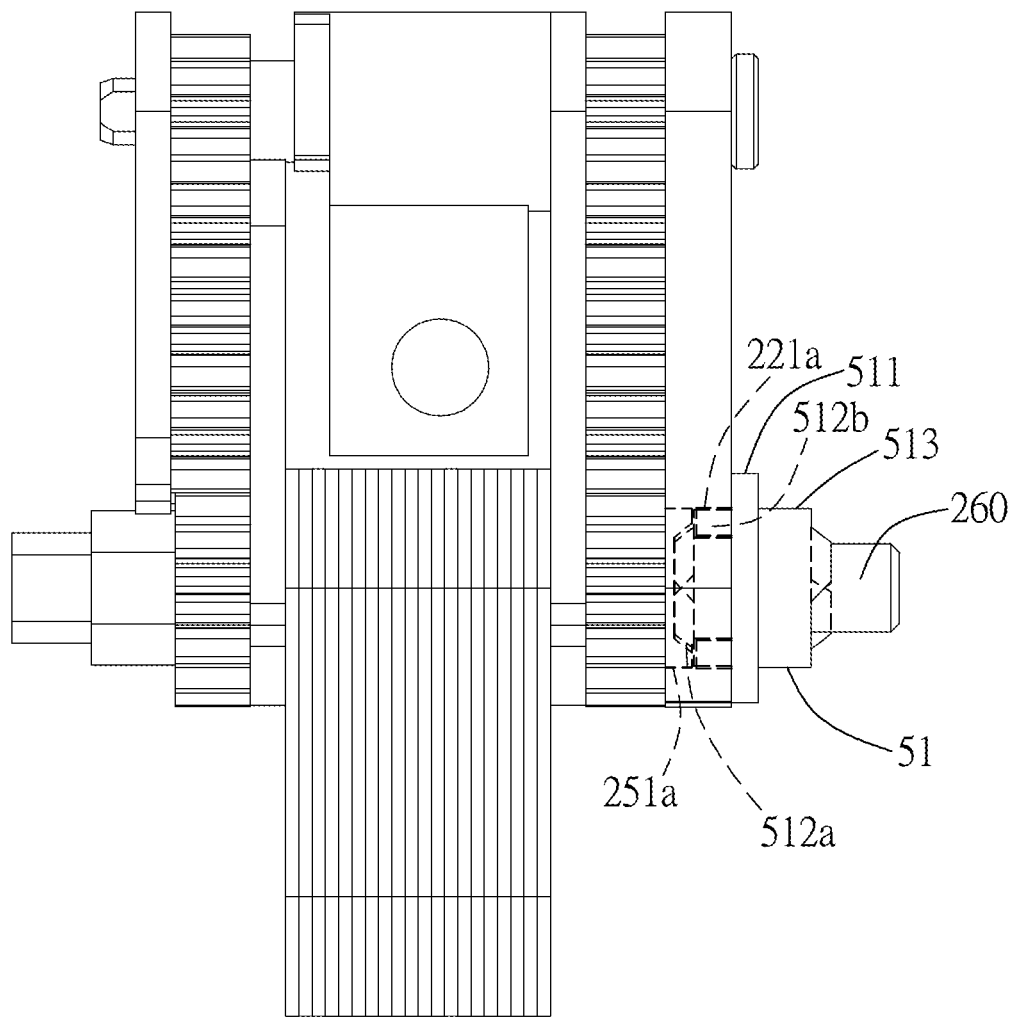
FIG. 10 is a top view of the embodiment, illustrating the hinge assembly in the folded state.
Figure 11:
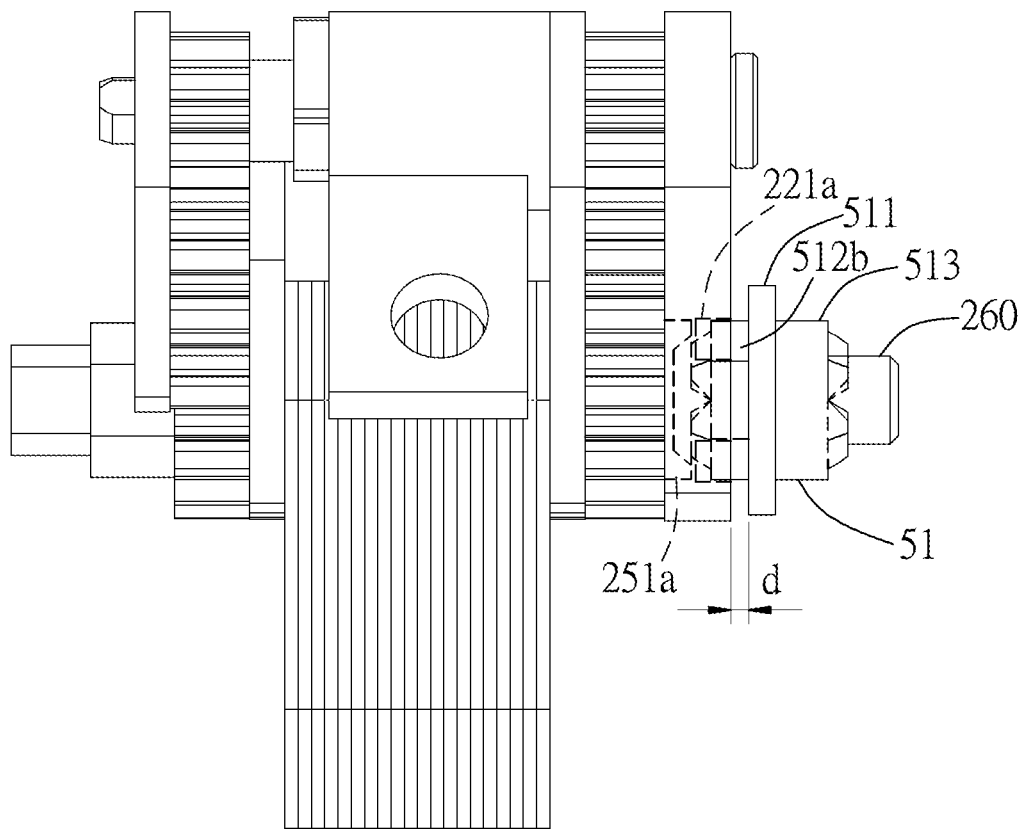
FIG. 11 is a top view of the embodiment, illustrating the hinge assembly in the spring-out state.

Referring to FIGS. 10 and 11, in combination with FIG. 2, when the linkage unit 2 rotates from the folded state to the spring-out state, the second cam structure 251a (FIG. 6) of the functioning gear 251 interacts with the first cam structure 512a to push the limiting member 51 to slide axially toward the second lateral wall 12 by a distance (d) as shown in FIG. 11 from an initial position as shown in FIG. 10, such that the second annular member 513 is received within the restricting groove 121 (see FIG. 2) to limit the limiting member 51 from rotating further. In addition, because the second engaging structure 221a is engaged with the first engaging structure 512b to enable the limiting member 51 to co-rotate with the second linkage set 22, when the linkage unit 2 is in the spring-out state, where the limiting member 51 is not rotatable within the restricting groove 121, the second linkage set 22 is limited by the limiting member 51 from moving further away from the receiving space 13. In other words, the linkage unit 2 in the spring-out state is limited from rotating further away from the receiving space 13. When the linkage unit 2 is driven to move back to the folded state by pushing the support plate 92 back to the accommodating portion 911, the first cam structure 512a is rotated to disengage from the second cam structure 251a, so that the returning spring 52 urges the limiting member 51 to slide away from the lateral wall 12 by the distance (d).

Figure 12:
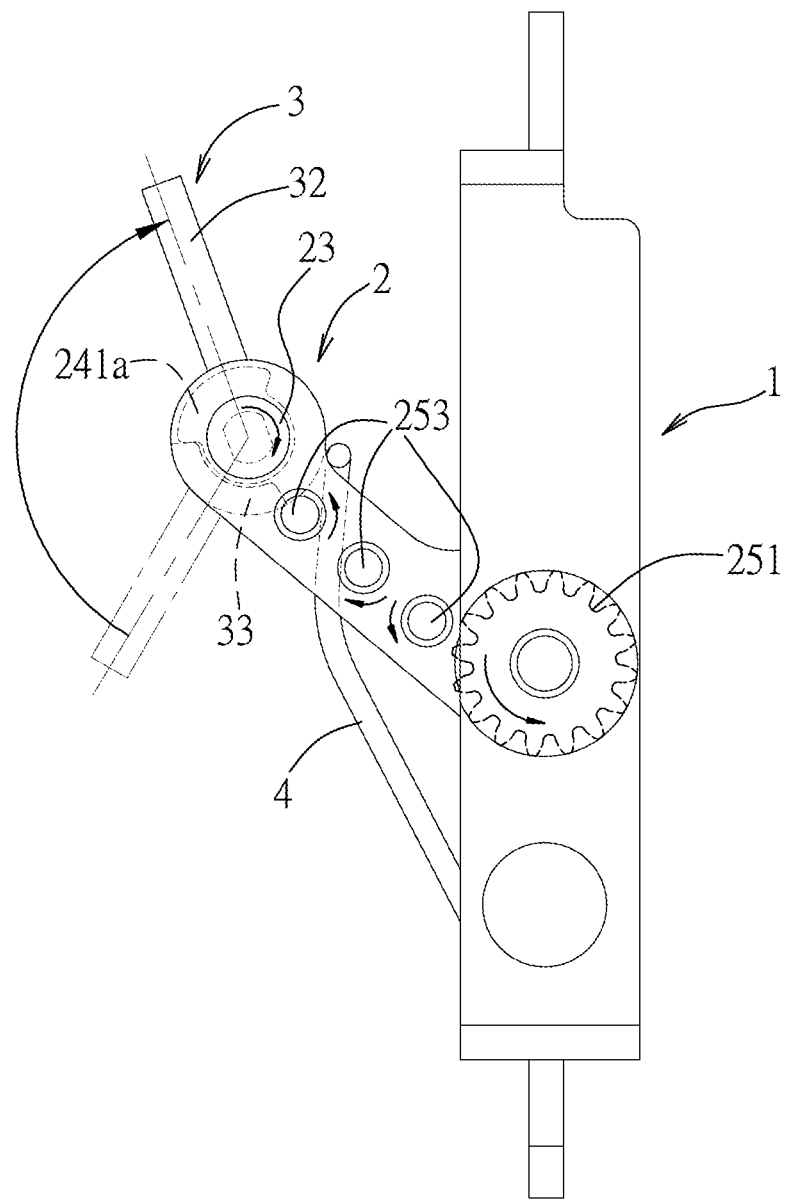
FIG. 12 is a side view of the embodiment, illustrating varying positions of the connection member and the second gear set during rotation of the hinge assembly.

Referring to FIG. 12, in combination with FIG. 9, after the linkage unit 2 is limited in the spring-out state, an external force may be applied to move the support plate 92 pivotally with respect to the casing body 91. Meanwhile, the movement of the support plate 92 causes the connection member 3 to rotate the linkage spindle 23, so that the transmitting gear 252 and the second intermediate gears 253 are driven to rotate by the linkage spindle 23. The external force causes the transmitting gear 252 and the second intermediate gears 253 to forcedly rotate the functioning gear 251 and the torque spindle 26 against the torsional resistance created by the torque unit 6. When the external force is removed from the support plate 92, the torsional resistance provided by the torque unit 6 will maintain the support plate 92 at a desired inclined angle relative to the casing body 91.

In this embodiment, as shown in FIG. 8, the abutting rib 241a and the driven rib 33 do not form a complete circle. In the spring-out state of the linkage unit 2, when the connection member 3 is clockwise rotated from a position shown in FIG. 9 to a position shown in FIG. 12, the driven rib 33 is clockwise rotated together with the connection member 3 without pushing the abutting rib 241a. Therefore, the rotational movements of the first gear set 24 and the second gear set 25 are not synchronized.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge assembly, comprising:
    a mounting seat having a first lateral wall, a second lateral wall opposite to said first lateral wall, and a receiving space disposed between said first and second lateral walls;
    a linkage unit including
        a first linkage set that is adjacent to said first lateral wall and that includes a first positioning portion and a first movable portion, and
        a second linkage set that is adjacent to said second lateral wall and that includes a second positioning portion, and a second movable portion, said first and second positioning portions being positioned in said receiving space and co-rotatable about a rotation axis extending through said first and second lateral walls;
    a connection member having a tubular pivot portion and a connection portion, said tubular pivot portion being disposed between said first and second movable portions, said connection portion extending radially and outwardly from said tubular pivot portion;
    a linkage spindle parallel to the rotation axis and extending through said first and second movable portions and said tubular pivot portion, said linkage spindle and said first and second movable portions and said tubular pivot portion being rotatable together about the rotation axis of said first and second positioning portions;
    a resilient unit connecting between said mounting seat and said linkage unit to urge said linkage unit to rotate to a spring-out state, in which said first and second movable portions and said connection member move outward from said receiving space, from a folded state, in which said first and second movable portions and said connection member are disposed in said receiving space;
    a limiting unit connected to said linkage unit to limit further rotation of said linkage unit when said linkage unit reaches the spring-out state; and
    a torque unit connected to said linkage unit to provide a torsional resistance when said linkage unit and said connection member are rotated by an external force to move away from the folded state and the spring-out state.

2. The hinge assembly as claimed in claim 1, wherein:
    said torque unit includes a torque spindle centered at the rotation axis and extending through said first and second positioning portions; and
    during rotation of said linkage unit to the spring-out state, said first and second positioning portions rotate relative to said torque spindle, said first and second movable portions rotate relative to said linkage spindle, and said tubular pivot portion and said linkage spindle do not rotate.

3. The hinge assembly as claimed in claim 2, wherein said linkage unit further includes a first gear set connected to said first linkage set, and a second gear set connected to said second linkage set, said first and second gear sets being respectively disposed at two opposite sides of said connection member.

4. The hinge assembly as claimed in claim 3, wherein:
    said connection member further has a driven rib extending axially from said tubular pivot portion toward said first linkage set; and
    said first gear set includes a driven gear formed with an abutting rib, said driven gear being juxtaposed with said first movable portion and sleeved rotatably on said linkage spindle, said abutting rib being mated with said driven rib to rotate said connection portion; and when said linkage unit rotates to the spring-out state by a restoring force of said resilient unit, said abutting rib rotates together with said driven gear and pushes said driven rib to rotate said connection portion to a predetermined angle.

5. The hinge assembly as claimed in claim 4, wherein the predetermined angle of said connection portion is smaller than 30 degrees.

6. The hinge assembly as claimed in claim 3, wherein said first gear set further includes a stationary gear juxtaposed with said first positioning portion and at least one first intermediate gear disposed between and meshed with said driven gear and said stationary gear.

7. The hinge assembly as claimed in claim 2, wherein said torque unit further includes a plurality of torque plates, said torque spindle being inserted into said torque plates in interference fit.

8. The hinge assembly as claimed in claim 3, wherein said second gear set includes a functioning gear, a transmitting gear and at least one second intermediate gear, said functioning gear being sleeved on and rotatable together with said torque spindle, said transmitting gear being sleeved on and rotatable together with said linkage spindle, said at least one second intermediate gear being disposed between and meshed with said functioning gear and said transmitting gear.

9. The hinge assembly as claimed in claim 8, wherein
    said torque spindle has a first end extending through said second lateral wall; and
    said limiting unit includes a limiting member slidably sleeved on said torque spindle between said second linkage set and said second lateral wall, and a returning spring disposed between said limiting member and said second lateral wall to urge said limiting member;
    said limiting member has a ring body, a first annular member extending from said ring body toward said second linkage set, and a second annular member extending from said ring body toward said second lateral wall, said first annular member having an end face formed with a first cam structure, and a circumferential surface formed with a first engaging structure;
    said second lateral wall has a restricting groove to accommodate and limit said second annular member from rotating;
    said functioning gear has a second cam structure capable of interacting with said first cam structure to push said limiting member to slide axially toward said second lateral wall when said linkage unit rotates from the folded state to the spring-out state, such that said second annular member is accommodated within said restricting groove to limit said limiting member from rotating further when said linkage unit is in the spring-out state; and
    said second linkage set further includes a second engaging structure engaged with said first engaging structure to enable said limiting member to co-rotate with said second linkage set when said linkage unit moves to the spring-out state.

10. The hinge assembly as claimed in claim 9, wherein said second linkage set includes a pair of second linkage plates disposed on two opposite sides of said second gear set, one of said second linkage plates having a through hole, said torque shaft extending through said through hole, said first annular member extending from said ring body into said through hole, said second engaging structure being formed inside said through hole.

11. The hinge assembly as claimed in claim 9, wherein said resilient unit includes a positioning rod and a coiled spring, said positioning rod having two opposite ends respectively extending into said first and second lateral walls, said coiled spring being sleeved on said positioning rod, and having one end fixed to said mounting seat and another end connected to said linkage unit.

12. The hinge assembly as claimed in claim 11, wherein
said connecting member further has a driven rib extending axially from said tubular pivot portion toward said first linkage set;
said first gear set includes a driven gear, a stationary gear, at least one first intermediate gear and an abutting rib, said driven gear being juxtaposed with said first movable portion and sleeved rotatably on said linkage spindle, said stationary gear being juxtaposed with said first positioning portion, said at least one first intermediate gear being disposed between and meshed with said driven gear and said stationary gear, said abutting rib being formed on said driven gear and engaged with said driven rib to rotate said connection member.

13. The hinge assembly as claimed in claim 12, wherein:
said first lateral wall having a non-circular through hole;
said stationary gear has a journaled portion, a toothed wheel portion surrounding said journaled portion, and a connecting groove formed centrally in said toothed wheel portion, said journaled portion having a non-circular section conforming in cross-section to and extending fittingly through said non-circular through hole; and
said torque spindle further having a second end opposite to said first end and inserted into said connecting groove.

\* \* \* \* \*